United States Patent [19]

Junier

[11] Patent Number: 5,062,445
[45] Date of Patent: Nov. 5, 1991

[54] WATER COOLED GATE VALVE

[75] Inventor: Marius R. Junier, Houston, Tex.

[73] Assignee: Triten Corporation, Houston, Tex.

[21] Appl. No.: 572,141

[22] Filed: Aug. 24, 1990

[51] Int. Cl.⁵ .............................................. F16K 49/00
[52] U.S. Cl. ..................................... 137/340; 137/375
[58] Field of Search ................................. 137/340, 375

[56] References Cited

U.S. PATENT DOCUMENTS

| | | |
|---|---|---|
| 1,102,197 | 6/1914 | Knox . |
| 1,142,180 | 6/1915 | Knox . |
| 3,068,888 | 12/1962 | Mohr, Jr. ............................ 137/340 |
| 3,207,174 | 4/1963 | Berczynski ......................... 137/315 |
| 3,266,517 | 2/1964 | Carr .................................... 137/340 |
| 3,487,849 | 1/1970 | Vietorisz ............................ 137/340 |
| 3,499,462 | 3/1970 | Berczynski ......................... 137/340 |
| 3,557,823 | 1/1971 | Carr .................................... 137/340 |
| 3,724,490 | 4/1973 | Kramer .............................. 137/340 |
| 3,770,005 | 11/1973 | Hendrik ............................. 137/340 |
| 3,773,068 | 11/1973 | Vietorisz ............................ 137/340 |
| 3,830,251 | 8/1974 | Uerlichs et al. ..................... 137/340 |
| 3,941,186 | 3/1976 | Schneider .......................... 137/340 |
| 4,161,959 | 7/1979 | Jansen et al. ....................... 137/340 |
| 4,292,992 | 10/1981 | Bhide ................................. 137/340 |
| 4,292,993 | 10/1981 | Felthuis ............................. 137/340 |
| 4,296,776 | 1/1981 | Muller ................................ 137/340 |

Primary Examiner—A. Michael Chambers
Attorney, Agent, or Firm—Vaden, Eickenroht, Thompson & Boulware

[57] ABSTRACT

There is disclosed a gate valve wherein each of the gate, a plate having an orifice over which the gate is movable to control flow through the valve, and rails for guidably receiving the parallel opposite side edges of the gate as it is so moved is cooled by water circulating through a passageway thereof.

5 Claims, 3 Drawing Sheets

WATER COOLED GATE VALVE

This invention relates generally to gate valves; and, more particularly, to improvements in gate valves having internal parts which are water cooled.

When gate valves are used in refineries or other environments for controlling the flow of high temperature fluids, it is often necessary to cool their internal parts.

For this purpose, it has been proposed to circulate water through passageways formed in each of the gate and the rods correcting the gate to an operator external to the valve body as well as the inner surfaces of the valve body in which the gate is guidable movable.

Valves of this general type are also often used for throttling purposes—i.e., in which the gate is intermediate open or closed position. If disposed in a horizontal or other than vertical position, as is often necessary, much of the gate of the prior valves would be inadequately supported in its throttling position, thus making the valve susceptible to considerable wear.

An object of this invention is to provide a water cooled valve of this general type in which the gate is securely supported when in throttling position and even though disposed horizontally or other than vertically.

Another object is to prove such a valve which is of relatively simple and inexpensive construction.

These and other objects are accomplished, in accordance with the illustrated embodiment of the present invention, by a water cooled gate valve having an orifice body with a plate mounted therein to form a continuation of flow from the inlet to the outlet from the valve body, guide rails mounted in the body at each side of the orifice, a gate having parallel side edges engaged with the guide rails for guided movement within the body and across a side of the plate between positions regulating flow through the orifice, and means for circulating water through each of the orifice plate, guide rails, and gate. Thus, the guide rails securely support the gate regardless of its flow regulating position relative to the orifice in the plate and whether or not the valve is disposed horizontally or other than in a vertical position.

In the preferred and illustrated embodiment of the invention, the water circulating means comprises a passageway extending continuously through each of the orifice plate, guide rails and gate, and means external of the body for supplying such fluid to one end of the passageway and withdrawing it from the other. The gate is moved by an operator having a pair of reciprocating rods connected to the gate, and the water circulating means includes a passageway in one rod leading to the one end of the passageway in the gate and a passageway in the other rod leading from the other end of the passageway therein. As also shown in the preferred embodiment, each guide rail is connected to the upstream side of the orifice plate and has a flange spaced from the upstream side of the orifice plate to form a groove therebetween in which a side edge of the gate is guidably slidable.

In the drawings, wherein like reference characters are used throughout to designate like parts:

FIG. 2 is an enlarged cross-sectional view of the gate, orifice plate and guide rails of the valve, as seen along broken lines 2—2 of FIG. 1;

Figure 1:
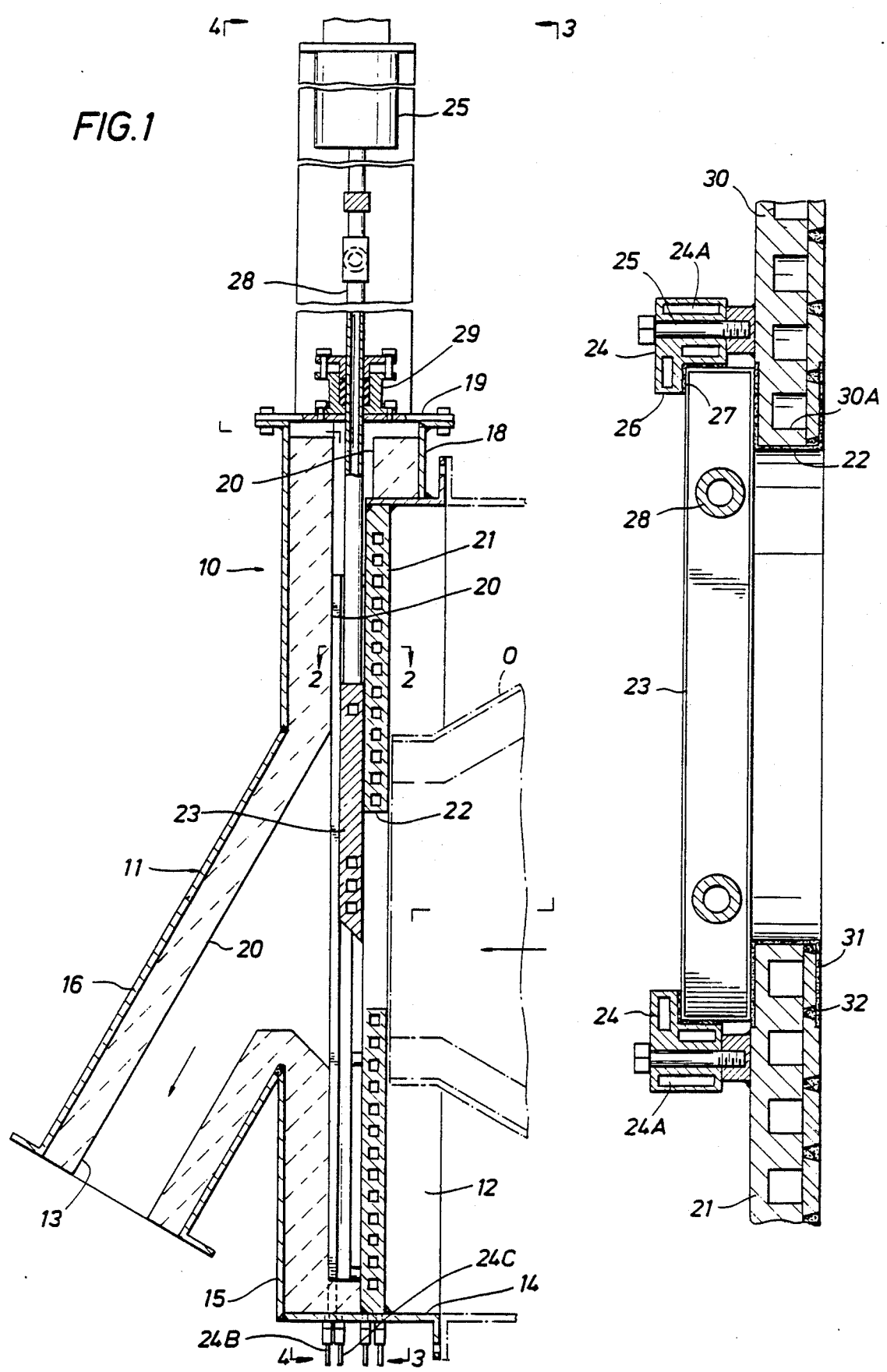
FIG. 1 is a vertical sectional view, partly in elevation, of a valve constructed in accordance with the preferred embodiment of the invention, and showing the gate thereof in a throttling position.
Figure 3:
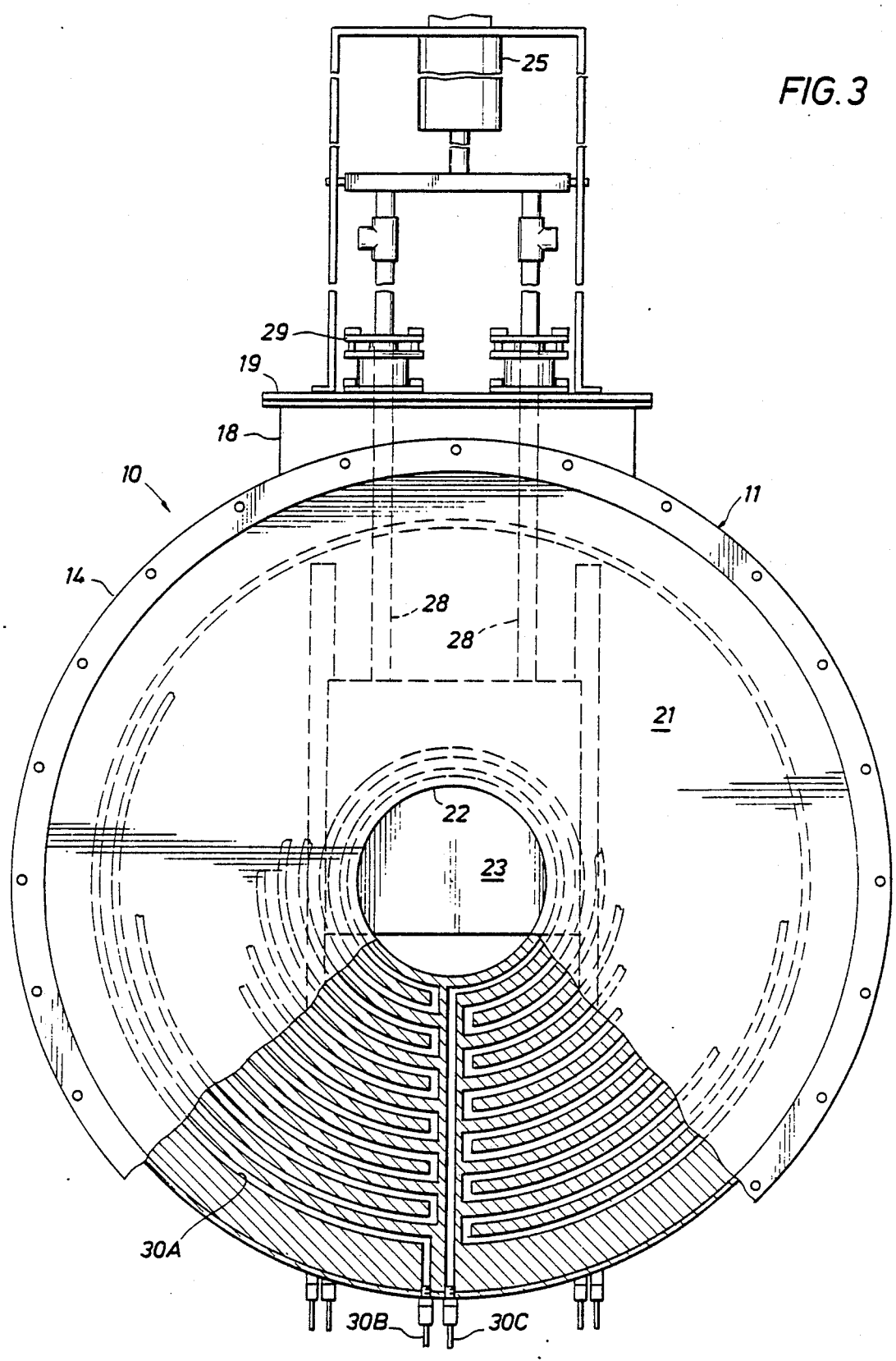
Figure 4:
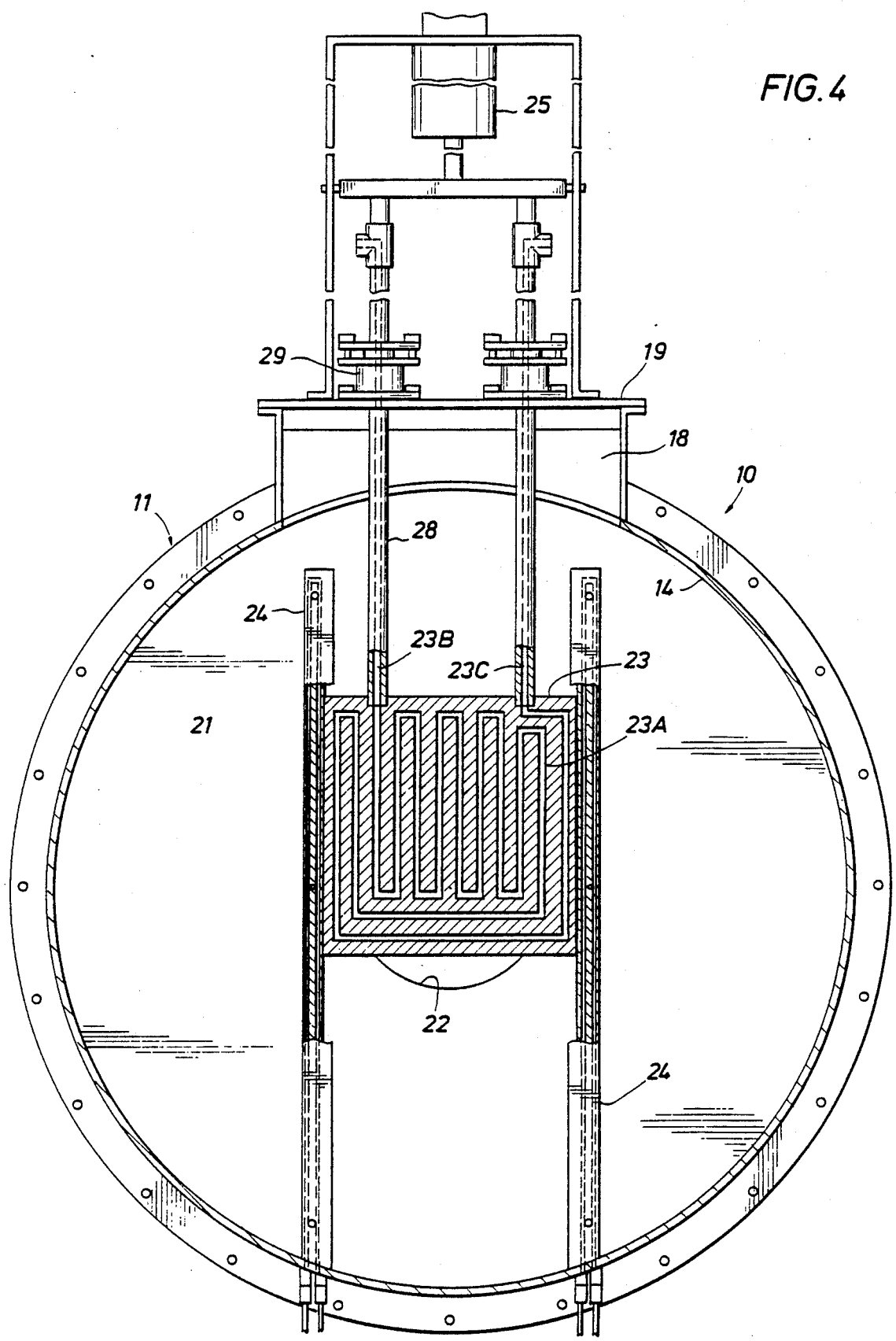

FIG. 3 is an end view of the valve, as seen along broken lines 3—3 of FIG. 1, but with a portion of the orifice plate broken away to show the water circulating passageway formed therein; and FIG. 4 is a view, partly in elevation and partly in section, of the opposite side of the valve of FIG. 1, as seen along broken lines 4—4 of FIG. 1, and with a portion of the gate and portions of the guide rails removed in order to show the passageways therein.

With reference now to the details of the above described drawings, the overall valve, which is indicated in its entirety reference character 10, comprises a valve body 11 having an inlet 12 thereto and an outlet 13 therefrom. More particularly, and as also shown in FIG. 1, the valve body comprises a metal ring 14 having a flange on its upstream end which, as shown in broken lines, is adapted to be bolted to the flange of a vessel having a conically shaped outlet $\underline{O}$ leading to the inlet to the valve body. The valve body also includes a metal disk 15 welded to the downstream end of the ring 14, and a tubular extension 16 welded to an opening in the disk to form the outlet from the valve body and having a flange on its outer end for connection to a flow conduit.

A metal bonnet housing 18 is welded to the top side of the ring and the disk 15 to close the inlet side and ends of the body above the ring, and a cover 19 is bolted to flanges on the upper ends of the disk and housing 18 to enclose a bonnet on the top of the body. Insulating material 20 lines the inside of the disk, the tubular extension 16 and the bonnet housing as to protect the inner surfaces of the metal housing from the heat of the fluid flowing therethrough.

A circular plate 21 having an orifice 22 therethrough is welded about its circumference to the inner diameter of the metal ring 14 generally intermediate the inlet and outlet of the valve body and with its orifice generally aligned with the outlet O from the vessel to which the valve is connected.

Flow through the orifice, and thus from the outlet of the vessel to the outlet of the valve body, is controlled by means of a gate 23 mounted within the valve body for reciprocation across the downstream side of the orifice plate. As shown in the drawings, the gate has been moved to a position in which its lower end is across the orifice 22 so as to throttle flow therethrough.

The gate is guided in its movement by means of elongate guide rails 24 mounted within the body and extending longitudinally along opposite sides of the orifice 22 in the plate 21. More particularly, and as best shown in FIG. 2, each of the guide rails is L-shaped and has a flange 26 on its inner side which cooperates with the downstream of the orifice plate to form a groove 27 to closely receive one side edge of the gate.

Thus, as previously noted, the gate is securely held so as to avoid vibrations and other movements which might cause it to wear, regardless of the orientation or disposition of the valve body, and even when the gate is in the throttling position, as shown. That is, for example, if the valve were disposed on its left side, as shown in the drawings, and thus connected to the lower end of the outlet $\underline{O}$ from the vessel, the weight of the gate would be carried by the guide rails, and the gate would be held securely between the flanges of the rails and the lower sides of the orifice plate.

The gate is adapted to be moved between different positions with respect to the orifice by means of an operator 25 connected to the gate by means of a pair of rods 28 extending through stuffing boxes 29 mounted on the top of the bonnet flange 19. The operator may be of any suitable fluid actuated, reciprocating type having an output shaft connected to the upper ends of the rods, as best shown in FIG. 3, and guidably moveable within a framework mounted on the bonnet.

As previously described, each of the orifice plate, gate and guide rails is cooled by means of water circulated therethrough. For this purpose, each such internal part of the valve has a passageway extending therethrough with an inlet at one end and an outlet at its opposite end, both having external connections to a water circulating system outside of the valve.

As best shown in FIG. 2, the orifice plate includes a pair of sheets 30 and 31, the sheet 30 being relatively thick and having a continuous groove 30A formed therein for connection at one end with a water inlet 30B and at its other end with a water outlet 30C. As shown by the broken away portion of FIG. 3, passageway 30A follows a circuitous path across the inner face of the sheet 30 so as to extend over substantially its entire side, the main portion of the passageway comprising substantially circular groove sections connected to radial sections at their ends.

The other sheet 31 of the orifice plate is welded to the inner side of the plate 30 so as to cover the grooves therein, and thus form the passageway in the orifice plate. For this purpose, the inner side of the sheet 31 is welded to the adjacent side of the inner sheet 30 intermediate the grooves by means of plug welds 32.

As best shown in FIG. 4, the gate also has a continuous passageway 23A formed therein with one end connecting with a water inlet 23B formed in one of the rods 28 and the other end connected with a water outlet 23C formed in the other rod. As shown, the gate is of square or rectangular configuration having parallel side edges, and the passageways extend predominately in a vertical direction, as shown in the drawings, with their ends connected by short lateral branches. Thus, as in the case of the orifice plate, the passageway in the gate extends across substantially its entire surface. As also shown, external fittings on the rods enable the passageways to be connected with flexible hoses (not shown) which permit reciprocation of the rods with the gate, rods relative to a fixed water circulation system.

Although not shown, it will be understood that the passageway 23A may be formed in the gate in substantially the same manner as was the passageway in the orifice plate. That is, the gate may be made up of parallel plates welded together in face-to-face relation, with a groove formed in one sheet and covered by the inner face of the other sheet.

Each of the guide rails 24 has a water passageway 24A formed therein with one end connected with a water inlet 24B and the other end connected with a water inlet 24C. More particularly, and as best shown in FIG. 4, the passageway extends longitudinally from the lower to the upper and from the upper to the lower end of the guide rail, with one extension being connected to the inlet and the other extension being connected to the outlet. Preferably, and as shown in FIG. 2, the portions of the passageway connecting with the inlet have branches, one of which projects into the flange 26 of the guide rail close to the face of the gate guided by the rail, and the other of which extends close to the side edge of the gate.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A water cooled gate valve, comprising
   a body having an inlet thereto and an insulated side wall in which the outlet is formed,
   a plate mounted in the body to extend across the interior thereof adjacent the inlet and spaced from the insulated side wall, said plate having an orifice therethrough,
   elongate guide rails mounted in the body between the side wall and plate and at each side of the orifice,
   a gate having parallel side edges which extend substantially its entire length and which are guidably slidable within the guide rails for guided movement within the body and across a side of the plate between positions regulating flow through the orifice,
   means on the body for so moving the gate, and
   means for circulating water through substantially the entire height and width of each of the orifice plate and gate and length of the guide rails.

2. A valve of the character defined in claim 1, wherein
   the circulating means comprises
   a passageway extending continuously through each of the orifice plate, guide rails and gate, and
   means external of the body for supplying such water to one end of the passageway and withdrawing it from the other.

3. A valve of the character defined in claim 2, wherein
   the gate moving means comprises an operator having a pair of reciprocating rods connected to the gate, and the water circulating means includes a passageway in one rod leading to the one end of the passageway in the gate and a passageway in the other rod leading from the other end of the passageway therein.

4. A valve of the character defined in claim 1, including
   means connecting each guide rail to the side of the orifice plate.

5. A valve of the character defined in claim 4, wherein
   each guide rail has a flange spaced from the side of the orifice plate to form a groove therebetween, and
   the side edges of the gate are guidably slidable in the grooves.

* * * * *